2,818,433

PROCESS FOR MAKING METHYLENEDIANILINES

Floyd B. Erickson, Dayton, Ohio, assignor to Monsanto Chemical Company, St. Louis, Mo., a corporation of Delaware No Drawing. Application September 19, 1955
Serial No. 535,259

7 Claims. (Cl. 260—570)

This invention relates to a novel process for the preparation of methylenediaromatic amines, particularly methylenedianilines. More specifically, it relates to the preparation of methylenedianiline by the reaction of 2 moles of an acid salt of aniline with 1 mole of formaldehyde in hot aqueous solution, the aniline being present in large excess, i. e., more than 100% over the stoichiometric amount.

Methylenedianiline is the starting material for a commerically valuable isocyanate, 4,4'-diisocyanatodiphenylmethane, which is used extensively in the production of synthetic resin materials. The expanding market for this isocyanate makes it of considerable importance that efficient and economic means be found for preparing the starting material for the isocyanate, i. e., the 4,4'-methylenedianiline.

The reaction utilized in the present invention is:

$$2C_6H_5NH_2 + HCHO \longrightarrow$$

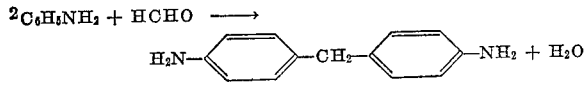

$$H_2N-\underset{}{\bigcirc}-CH_2-\underset{}{\bigcirc}-NH_2 + H_2O$$

The reaction takes place in an acid medium, amounts of acid approximately stoichiometrically equivalent to the amount of aniline, being used.

The common prior art procedure for the production of methylenedianiline consisted of adding aniline to the stoichiometric amount of hydrochloric acid to form the amine salt at a temperature below 40° C., and adding formaldehyde to this slurry with good cooling to keep the temperature below 40° C. The resulting slurry was agitated for a short period and the temperature was then raised to 90 to 100° C. for several hours. In this procedure it was customary to use a 50% excess of aniline, i. e., a 3 to 1 molar ratio of aniline to formaldehyde, although occasionally no excess aniline was used.

It has now been discovered that an improved yield may be obtained if a much larger excess of aniline is used, such as a stoichiometric excess greater than 100%. A 6 to 1 molar ratio of aniline to formaldehyde has been found particularly good, and even a 10 to 1 ratio gave better results than the 3 to 1 ratio of the prior art. It appears that any molar ratios of aniline to formaldehyde from 6 to 1 to 10 to 1 and even higher would give improved results, although ordinarily there would be no reason for using higher ratios, as it would only make it necessary to separate a larger excess from the product.

The present process is usually conducted by merely forming the aniline hydrochloride salt in aqueous solution, adding formaldehyde at the reaction temperature around 60 to 75° C., and then heating the mixture for about one hour. This procedure is more simple than that of the prior art in that separate cooling and heating steps are not necessary. Moreover, the solution of the present procedure is easier to work with than the slurry of the prior art.

The present process is applicable not only to aniline, but to substituted anilines, such as anilines containing alkyl substitutents on the benzene ring, particularly methyl or ethyl radicals, so long as at least one of the para and ortho positions is left free. If the para position is blocked, coupling takes place at the ortho position; it is preferred that the para position be free. Moreover, there may be alkyl substituents on the nitrogen, as in N-methylaniline, N-propylaniline, N-butylaniline, N-isobutylaniline, N-isoamylaniline, N-hexylaniline, N,N-diethylaniline, N,N-dibutylaniline, etc. Among the alkyl groups which can be substituted on the ring are methyl, ethyl, propyl, isopropyl, butyl, isobutyl, secondary butyl, tertiary butyl, n-amyl, isoamyl, tertiary amyl, n-hexyl, decyl, dodecyl, etc. The ring can also contain alkoxy substituents such as methoxy, ethoxy, isopropoxy, butoxy, hexyloxy, etc., radicals, or halogen substituents, such as bromine, chlorine and fluorine. Examples of a few of the anilines to which the present process is applicable are the following: o-toluidine, m-toluidine, p-toluidine, 2,6-dimethylaniline, 2,6 - diethylaniline, 2,6 - diisobutylaniline, o-pentylaniline, m-pentylaniline, o-chloroaniline, m-chloroaniline, o-bromoaniline, o-anisidine, m-anisidine, N-ethyl-o-toluidine, and N,N-dimethyl-o-toluidine. The preferred anilines are those containing no substituents other than alkyl substituents, and particularly when the para position is free.

The rate of addition of the aniline to the hydrochloric acid, and the temperature during this procedure are not critical.

While the amount of acid does not have to be exactly equivalent to the aniline, it has been found that the use of much greater or lesser amounts has an adverse effect on the yield; the amount should not be substantially in excess of the aniline but should be sufficient to form a salt with most or substantially all of the aniline. Although hydrochloric acid is the preferred acid, other mineral acids, for example sulfuric acid can be used, or organic acids, for example acetic acid can be used, but they are less satisfactory.

The general procedure used in the following examples was as follows:

Hydrochloric acid (37% aqueous) was charged to a flask and heated to the desired reaction temperature. Aniline was added from an addition funnel at such a rate that the desired temperature could be maintained with intermittent cooling by a water bath. Then heat was applied and formaldehyde (37% aqueous solution) was added dropwise with heating; heating was continued after the addition was complete. The mixture was stirred throughout the addition and heating period.

At the completion of the heating period water was added, about 100 ml. being added for each mole of aniline used. The resulting solution was heated to 70 to 80° C. and neutralized with solid sodium carbonate. The amine layer was separated and, after adding a pinch of zinc dust, it was distilled.

EXAMPLE 1

In this example the general procedure was followed, and 3 moles of aniline for 1 mole of formaldehyde was used. A 10% solution of formaldehyde was used. The aniline was added to the hydrochloric acid at 60–70° C. in 0.25 hour, the formaldehyde solution was added at 65 to 70° C. in 0.92 hour, and the mixture was further heated for 1 hour at 65 to 70° C. The yield of methylenedianiline was 71.2% of theory based on unrecovered aniline, and 66.1% based on formaldehyde charged. Neither of these values was corrected for impurities in the product.

EXAMPLE 2

This example was the same as Example 1, except that 37% formaldehyde was used and it was added in one hour, and 6 moles of aniline was used for 1 mole of formaldehyde. The uncorrected yield was 76.9% based on aniline and 80% based on formaldehyde.

The use of a higher ratio of aniline improved the yield considerably over that of Example 1.

EXAMPLE 3

This example is the same as Example 2 except that the time of addition of the aniline was slightly different, being 0.4 hour. 6 moles of aniline was used. The yield was again improved over that of Example 1, the uncorrected values being 82.2% and 83.4% respectively.

EXAMPLE 4

This example is the same as Example 2 except the addition time of the formaldehyde was 0.6 hour, and the temperature of this addition and subsequent heating was 65 to 73° C. 6 moles of aniline was used. The uncorrected yield was 81.4% based on unrecovered aniline, and 84.6% based on formaldehyde.

EXAMPLE 5

In this example, 10 moles of aniline was used, the addition time of the aniline was 0.66 hour, and the addition time of the formaldehyde was 1 hour. The uncorrected yield was 78% based on aniline and 85.5% based on formaldehyde.

Another run using a 3 to 1 molar ratio of aniline to formaldehyde (37% aqueous) and using a procedure substantially the same as the present examples except that the amine layer was extracted from the reaction mixture with benzene, showed an uncorrected yield of 70.3% based on aniline and 65.9% based on formaldehyde.

EXAMPLE 6

6 moles of aniline was reacted with 1 mole of formaldehyde. The formaldehyde solution was added at 65 to 70° C. in one hour but there was no further heating. The uncorrected yield was 77.7% based on aniline and 78.5% based on formaldehyde.

EXAMPLE 7

In this example using 6 moles of aniline, the heating time after addition of the formaldehyde was 5 hours. The uncorrected yield was 82.2% based on aniline, and 85.5% based on formaldehyde.

It appears that heating for a short time after the formaldehyde addition, e. g., for a few minutes to 1 to 5 or even 10 hours or more, insures a more complete reaction and improves the yield. A heating time of 1 to 5 hours is preferred.

EXAMPLE 8

In this example using 6 moles of aniline, the formaldehyde was added in 1.4 hours, and the mixture was heated at 70 to 75° C. for 1 hour after the addition. The yield was 83.7% based on aniline and 87.0% based on formaldehyde.

While 60 to 75° C. is the preferred temperature range, other temperatures, such as those in a 50° to 90° C. range may be used.

The rate of addition of the formaldehyde solution can be varied considerably, but it should be slow enough to insure good mixing and temperature control with the reactor used. Ordinarily an addition time of 0.5 to 1.5 hours is satisfactory. The formaldehyde should be added to the aniline, rather than the aniline to the formaldehyde, in order to always have excess aniline present.

EXAMPLE 9

Only 3 moles of hydrochloric acid were used for 6 moles of aniline, and the aniline was reacted with one mole of formaldehyde as in the previous examples. The yield was 78.7% based on aniline and 76.8% based on formaldehyde. The assay for the product was also low, showing only 91.4% of the desired product.

EXAMPLE 10

In this example 4 moles of hydrochloric acid were used for 3 moles of aniline, and the reaction was conducted as in the previous examples. The yield was 19.8% based on aniline and 14.2% based on formaldehyde.

It is apparent from Examples 9 and 10 that amounts of acid close to the stoichiometrically equivalent amount should be used, or the yields will be adversely affected.

While formaldehyde itself is the preferred reactant, other known sources of formaldehyde such as methylal or para-formaldehyde may be used. The following example shows the use of para-formaldehyde.

EXAMPLE 11

Six moles of aniline hydrochloride was formed by adding aniline to 6 moles of hydrochloric acid at 60 to 70° C. in 0.25 hour. Then an amount of para-formaldehyde equivalent to 1 mole of formaldehyde was added all at once and the mixture was heated to 65 to 70° C. for 2.5 hours. The uncorrected yield was 78.5% based on aniline and 81.5% based on formaldehyde.

The ordinary separation procedure is to separate the insoluble amine layer from the neutralized reaction mixture, distill off the aniline, and then distill the methylenedianiline. However, it is also possible to extract the amines from the neutralized mixture with an organic solvent, such as benzene, and then separate the methylenedianiline by distillation.

While sodium carbonate was selected as a convenient base for neutralization, other alkalies may be used, such as sodium hydroxide, potassium hydroxide, ammonium hydroxide, etc., or alkaline earth oxides or hydroxides such as lime, etc., or any other common bases. The neutralization point can be determined by the usual indicators, or the calculated amount or a slight excess of base may be added; for example 3.2 moles of sodium carbonate may be used for mixtures containing 6 moles of hydrochloric acid.

The methylenedianiline product was assayed by infrared analysis to determine the percentage of methylenedianiline. Standards for this procedure were prepared from purified methylenedianiline containing added N,N'-diphenylmethanediamine, anhydroformaldehydeaniline and aniline as impurities.

Significant data from Examples 1 to 11 are summarized for convenience in Table I. It is to be noted that the yield in Example 1 which used only a 3 to 1 molar ratio of aniline to formaldehyde was lower than the yield in all other examples except Example 10 in which a large excess of hydrochloric acid was present during the reaction.

Table 1

| Example | Charge | | Heating | | Methylenedianiline | | |
|---|---|---|---|---|---|---|---|
| | 37% HCl, moles | PhNH₂, moles | Temp., °C. | Time, hr. | Assay, percent | Uncorrected Yield | |
| | | | | | | Based on PhNH₂, percent | Based on HCHO, percent |
| 1 a | 3.0 | 3.0 | 65-70 | 1.0 | ------ | 71.2 | 66.1 |
| 2 | 6.0 | 6.0 | 65-70 | 1.0 | 94.8 | 76.9 | 80.0 |
| 3 | 6.0 | 6.0 | 65-70 | 1.0 | 96.7 | 82.2 | 83.4 |
| 4 | 6.0 | 6.0 | 65-76 | 1.0 | 96.4 | 81.4 | 84.6 |
| 5 | 10.0 | 10.0 | 65-70 | 1.0 | 94.4 | 78.0 | 85.5 |
| 6 | 6.0 | 6.0 | ------ | 0.0 | 92.4 | 77.7 | 78.5 |
| 7 | 6.0 | 6.0 | 65-70 | 5.0 | 99.8 | 82.2 | 85.5 |
| 8 | 6.0 | 6.0 | 70-75 | 1.0 | 96.7 | 83.7 | 87.0 |
| 9 | 3.0 | 6.0 | 65-70 | 1.0 | 91.4 | 78.7 | 76.8 |
| 10 | 4.0 | 3.0 | 65-70 | 1.5 | ------ | 19.8 | 14.2 |
| 11 b | 6.0 | 6.0 | 65-70 | 2.5 | 96.7 | 78.5 | 81.5 |

The charge also included one mole of 37% formaldehyde unless otherwise noted.
a The one mole of formaldehyde was added as a 10% solution.
b An amount of paraformaldehyde equivalent to one mole of formaldehyde was added as a solid.

It has been reported (King, J. Chem. Soc., 117, 988 (1920)) that crude distilled methylenedianiline prepared from either N,N'-diphenylmethanediamine or anhydroformaldehydeaniline is a 9:1 mixture of the 4,4'-and 2,4'-derivatives. In the present work the isomer content was not determined; it was assumed that the product would be predominantly the 4,4'-derivative, unless the para position was blocked to give the 2,2'-product.

A method for the preparation of methylenedianiline has been described, which permits the preparation of the products in better yields than those previously obtained. While the invention has been described with particular references to various preferred embodiments thereof, it will be understood that numerous modifications and variations are possible without departing from the invention.

I claim:

1. The method of preparing a 4,4'-methylenedianiline which comprises heating a source of formaldehyde selected from the group consisting of formaldehyde, dimethoxy methane and paraformaldehyde, with more than a 100% stoichiometric excess of the hydrochloric acid salt of a single aniline in which the para position is free of substituents, to a temperature of 50 to 90° C. in an aqueous medium, and recovering the said methylenedianiline product.

2. The method of preparing a 4,4'-methylenedianiline which comprises heating at 50 to 90° C. in an aqueous medium a source of formaldehyde selected from the group consisting of formaldehyde, dimethoxy methane and paraformaldehyde with more than a 100% stoichiometric excess of an acid salt of a single monocyclic aniline containing no substituents other than lower alkyl substituents and in which the para position is free of substituents, neutralizing the reaction mixture and recovering the methylenedianiline product from the mixture.

3. The method of preparing methylenedianiline which comprises reacting aniline with formaldehyde by heating to 50 to 90° C. in an aqueous solution, the aniline being present in an amount greater than a 100% stoichiometric excess but no greater than 10 moles for each mole of formaldehyde, most of the aniline being present as an acid salt, neutralizing the reaction mixture with a base, and separating the methylenedianiline.

4. The method of claim 3 in which the reactants are heated at 60° to 75° C. for from a few minutes to 10 hours.

5. The method of preparing methylenedianiline which comprises heating an aqueous reaction mixture containing 6 to 10 moles of the aniline salt of hydrochloric acid and 1 mole of formaldehyde to a temperature of 50° to 90° C. for one to five hours.

6. The method of preparing methylenedianiline which comprises adding an aqueous solution of formaldehyde to an aqueous solution of aniline hydrochloride, the aniline hydrochloride solution having been heated to a temperature of 50° to 90° C., and maintaining this temperature for one to five hours, 6 to 10 molar parts of aniline being used for each molar part of formaldehyde.

7. The method of preparing methylenedianiline which comprises adding 6 moles of aniline to an aqueous hydrochloric acid solution containing approximately 6 moles of hydrochloric acid, adding to the resulting solution at 60° to 75° C. an aqueous solution containing 1 mole of formaldehyde, the formaldehyde solution being added in 0.5 to 1.5 hours, heating the mixture at 60 to 75° C. for 1 to 5 hours, neutralizing the mixture with sodium carbonate, separating the resulting amine layer, and distilling the methylenedianiline.

References Cited in the file of this patent

UNITED STATES PATENTS

| | | |
|---|---|---|
| 471,659 | Vongerichten | Mar. 29, 1892 |
| 541,859 | Koreff | July 2, 1895 |
| 763,756 | Homolka | June 28, 1904 |
| 1,803,331 | Kladivko | May 5, 1931 |
| 2,034,491 | Sloan | Mar. 17, 1936 |

FOREIGN PATENTS

| | | |
|---|---|---|
| 58,955 | Germany | Sept. 7, 1891 |
| 70,402 | Germany | July 19, 1893 |
| 270,663 | Germany | Feb. 21, 1914 |